United States Patent
Louch et al.

(10) Patent No.: US 8,354,818 B2
(45) Date of Patent: Jan. 15, 2013

(54) SOLAR CHARGED HYBRID POWER SYSTEM

(75) Inventors: Robert Jay Louch, Highland, MI (US); Donald Charles Franks, Linden, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 25 days.

(21) Appl. No.: 11/869,212

(22) Filed: Oct. 9, 2007

(65) Prior Publication Data

US 2010/0213887 A1  Aug. 26, 2010

(51) Int. Cl.
*H02J 7/00* (2006.01)
*H02J 7/16* (2006.01)

(52) U.S. Cl. ........ 320/101; 320/119; 320/120; 320/121; 320/104; 320/125

(58) Field of Classification Search ............... 320/101, 320/104, 117, 118, 119, 120, 121, 124, 125, 320/127, 132, 134, 135, 136, 137
See application file for complete search history.

(56) References Cited

U.S. PATENT DOCUMENTS

| | | | |
|---|---|---|---|
| 4,277,737 A | 7/1981 | Muller-Werth | |
| 4,327,316 A | 4/1982 | Fujikubo et al. | |
| 4,489,242 A * | 12/1984 | Worst | 307/10.1 |
| 4,564,799 A | 1/1986 | Iwaki et al. | |
| 4,581,572 A | 4/1986 | Yoshiyuki et al. | |
| 4,963,811 A | 10/1990 | Weber | |
| 5,162,720 A | 11/1992 | Lambert | |
| 5,488,283 A | 1/1996 | Dougherty et al. | |
| 5,684,385 A | 11/1997 | Guyonneau et al. | |
| 5,779,817 A * | 7/1998 | Wecker | 136/244 |
| 6,034,506 A * | 3/2000 | Hall | 320/117 |
| 6,222,341 B1 | 4/2001 | Dougherty et al. | |
| 6,239,996 B1 | 5/2001 | Perreault et al. | |
| 6,452,361 B2 | 9/2002 | Dougherty et al. | |
| 6,476,315 B2 * | 11/2002 | Ganz | 136/244 |
| 6,765,363 B2 * | 7/2004 | LaFollette et al. | 320/107 |
| 6,856,116 B1 * | 2/2005 | Kirkpatrick | 320/101 |
| 2004/0202900 A1 * | 10/2004 | Pavio et al. | 429/9 |
| 2006/0162973 A1 * | 7/2006 | Harris et al. | 180/65.3 |
| 2009/0001926 A1 * | 1/2009 | Sato | 320/102 |
| 2009/0289594 A1 * | 11/2009 | Sato | 320/101 |
| 2009/0295234 A1 * | 12/2009 | Lu et al. | 307/150 |
| 2009/0314556 A1 * | 12/2009 | Harris | 180/65.1 |

OTHER PUBLICATIONS

Chinese Office Action 200880106598.5.

* cited by examiner

*Primary Examiner* — Edward Tso
*Assistant Examiner* — Alexis Boateng
(74) *Attorney, Agent, or Firm* — David Kelley, Esq.; Tung & Associates

(57) ABSTRACT

A solar powered hybrid power system including a solar charge collector; a charge storage system comprising at least a first charge storage device adapted to receive and store charge from said solar charge collector; wherein said charge storage system further comprises a power electronic circuit selectively connectable to at least a second charge storage device, said power electronic circuit adapted to transfer said stored charge to said at least a second charge storage device at a selectable voltage level.

18 Claims, 1 Drawing Sheet

IF HV BATTERY < FULL CHARGE THEN
    SET OUTPUT TO HIGH VOLTAGE BATTERY
    SET OUTPUT VOLTAGE TO HV CHARGE VOLTAGE
ELSE
    SET OUTPUT TO LV (E.G., 13.7 VOLTS DC)

IF LV BATTERY < FULL CHARGE THEN
        SET OUTPUT TO LV BATTERY
    ELSE
        IF INTERIOR TEMP < TEMP1 THEN
            SET OUTPUT TO RESISTIVE HEATER
        ELSE
            SET OUTPUT TO COOLING SYSTEM
        END IF
    END IF
END IF

SOLAR CHARGED HYBRID POWER SYSTEM

FIELD OF THE INVENTION

This invention generally relates to hybrid vehicles, and more particularly provides a charging system and method of charging a hybrid vehicle's charge storage system including a high-voltage (HV) traction battery.

BACKGROUND OF THE INVENTION

Hybrid power systems employing multiple power energy sources require careful control of system components in order to coordinate the delivery of power from the sources to system loads. These loads can vary widely in magnitude, and occur unexpectedly in time, particularly in hybrid powered vehicles. Hybrid systems using fuel cells and battery packs as energy sources to power vehicles must be closely controlled to assure adequate reserve power is available under a variety of conditions, including having available sufficient power to start a hybrid vehicle after long period of non-use, or during electric-drive-only modes of operation.

In order to assure that adequate power is present in the a hybrid vehicle's traction battery pack and that proper charging and discharging of the battery is maintained, the state-of-charge (SOC) of the battery is monitored, and charging and discharging are controlled so that the SOC remains within an acceptable range or "window". When the SOC is low, the fuel cell may be called upon to produce power in order to charge the battery to keep the SOC within the desired window.

Typically, an auxiliary charge storage device such as a battery is used for starting the engine in a hybrid vehicle while another charge storage device such as the HV traction battery is used alone or in combination with an internal combustion engine for powering of the vehicle. The HV traction battery may partially discharge over extended periods of non-use, during electric drive only operations when only the HV traction battery is powering the vehicle, or during repeated stop and start operation where the HV traction battery is repeatedly used. Consequently, the performance of the vehicle may be compromised.

In the prior art, solar as well as plug-in power systems have been proposed for the recharging of an on-board vehicle battery.

For example, in U.S. Pat. No. 4,327,316, a rechargeable auxiliary battery formed by solar batteries is used to charge a vehicle battery using recharging current means. The charging system is used to avoid discharge of the battery during extended periods of non-use or when repeated vehicle stop operations are required.

In U.S. Pat. No. 4,564,799, a dual battery system is used wherein a secondary battery is charged by a secondary power source which is a solar cell. The secondary battery is used to start the motor (e.g., for the ignition device) to improve the starting performance of the vehicle.

In U.S. Pat. No. 4,581,572 a solar battery independent of the vehicle battery is used to increase the output of an AC (alternating current) generator used for recharging the vehicle battery.

In U.S. Pat. No. 5,162,720 a supplemental utility AC source such as a 110V duplex outlet is used together with a converter to allow recharging of an auxiliary battery. Charging current may flow in one direction from the auxiliary battery to the engine battery to reduce the risk of the engine battery becoming too depleted to start the vehicle engine.

U.S. Pat. Nos. 6,222,341 and 6,452,361 discuss a vehicle including a dual battery system where a reserve battery is used together with charge maintenance devices to produce a relatively low charging rate to a starting battery during periods where the vehicle is not in use or when the starting battery requires additional charge. The reserve battery is charged by the vehicle alternator.

Other prior art sources have generally proposed recharging the primary vehicle battery by means of solar power or AC utility.

In order to overcome the problem of depletion of a hybrid vehicle charge storage device such as a high voltage (HV) traction battery, it would be advantageous to provide a system and method to avoid undesired depletion of the HV traction battery, as occurs for example, during extended periods of non-use of the vehicle or during electric-drive-only modes of operation of the hybrid vehicle.

It is therefore an object of the invention to provide a system and method to avoid undesired depletion of a charge storage device such as the HV traction battery, as occurs for example, during extended periods of non-use of the vehicle or during electric-drive-only modes of operation of the hybrid vehicle.

SUMMARY OF THE INVENTION

According to one aspect of the invention, a method and system is provided for providing a first charge storage device such as an auxiliary low voltage (LV) battery that may be charged by solar power where the solar charge is accumulated in the auxiliary battery to accumulate a useable charge level, for example a charge level sufficient to transfer the accumulated charge in the LV battery to a second charge storage device such as a high voltage (HV) traction battery which then may be used to start the vehicle as well as drive an electric motor used to power the vehicle. In addition, the accumulated solar charge in the auxiliary battery may also be used to power auxiliary vehicle systems or used to provide auxiliary power for operation or charging of separate devices.

In an important feature of the invention, charging may be provided from a low voltage (LV) battery (charge storage device) to a high voltage (HV) traction battery (charge storage device) to allow an efficient and expedited transfer the accumulated solar charge in the auxiliary LV battery to the HV battery.

In another feature of the invention, the LV battery including the accumulated solar charge in the LV battery, may be selectively connected with auxiliary vehicle power systems to provide power at a selected voltage (e.g., LV battery operating voltage or other voltage) for various purposes, for example, provide power for resistive heating to defrost windshields or solar collection panels, to heat the interior of the vehicle including heating seats or steering wheels, provide power for cooling systems, such as exhaust/cooling fans or electric Air Conditioning, or provide power to recharge or operate third party devices e.g., mobile phones, mobile audio systems, and the like.

In another aspect of the invention, power (charge) is collected by solar collection means, the collected charge is transferred through a power electronic circuit including a voltage converter to the LV battery to accumulate the solar charge to a useable level, wherein power may then be provided from the LV battery to recharge the vehicle high voltage (HV) battery, or to run auxiliary power systems, where decisions on whether to recharge batteries or run auxiliary power systems are made by a programmable controller in response to a sensed vehicle condition and/or a sensed battery charge level condition.

These and other embodiments, aspects and features of the invention will be better understood from a detailed description of the preferred embodiments of the invention which are further described below in conjunction with the accompanying Figures.

DETAILED DESCRIPTION OF THE PREFERRED EMBODIMENT

Figures 1, 2:
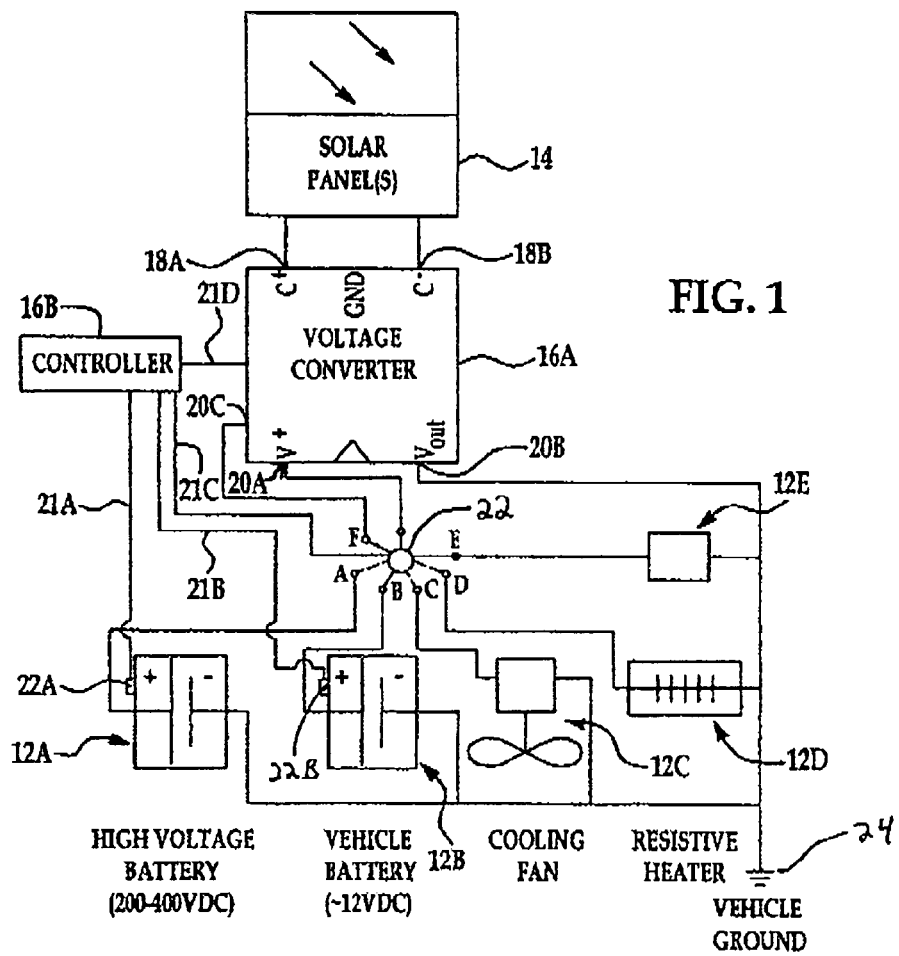
FIG. 1 is a block diagram of a portion of a vehicle hybrid power system according to an embodiment of the present invention.
FIG. 2 is exemplary programming logic to operate a controller showing an exemplary voltage output decision logic to control power provided within the vehicle hybrid power system according to an embodiment of the present invention.

Referring to FIG. 1 is shown a block diagram showing a portion of an electrical power circuit within a hybrid powered vehicle. The hybrid powered vehicle may any hybrid powered vehicle which includes a high voltage charge storage device such as (HV) battery 12A. The HV battery 12A may be used for powering an electric drive motor (traction motor) in the hybrid vehicle and may be used for providing power to start an engine, such as an internal combustion or diesel engine. For example, the high voltage (HV) battery 12A may operate in a range of form about 200 to about 400 volts DC. It will be appreciated that other charge storage devices including capacitors and ultra-capacitors, as are known in the art, may be used in place of a high voltage (HV) battery or low-voltage (LV) battery according to the present invention.

The hybrid vehicle includes solar collection means 14, which may be solar panels attached and positioned on the vehicle in any convenient manner or may be solar collection means incorporated into the exterior facing portions of the vehicle such as the vehicle body or windshields. For example, collection means (solar panels) 14 collect electrical charge upon exposure to solar energy which is then transferred by conventional wiring means to a power transfer electronic circuit including a power/voltage converter 16A which may be connected to (e.g., wired connection 21D) or have incorporated therein a programmable charge controller 16B. The power/voltage converter 16A accepts an input voltage from the solar panels, for example, through inputs 18A, 18B (positive and negative terminals). The power/voltage converter 16A is further in communication with the charge controller (16B).

The power/voltage converter 16A outputs the voltage, for example through outputs 20A, 20B according to a predetermined programmed voltage, where one of the terminals (e.g., 20A) of the voltage output (e.g., positive Voltage) is connected to a selected input (e.g., A, B, C, D, E) including auxiliary power circuits (e.g., C, D, E) or an HV battery (A) wired in parallel with respect to the power/voltage converter. An electrical circuit switching means 22, included in the power transfer electronic circuit, is in communication with charge controller 16B (e.g., wired connection 21C) and may be used to selectively connect a voltage output (e.g., 20A) to one of the inputs (e.g., A, B, C, D, E). The circuit switching means 22 may be a conventional relay switching device capable of multiplexed switching controlled by charge controller 16B. For example the switching means 22 is capable of connecting an output of the voltage converter (e.g., 20A) to an input of the LV battery 12B (terminal B) where the voltage source to the power/voltage converter is the solar collection means 14. In addition, the switching means may operate terminal B as an output of the LV battery 12B which is then also connected to an input of the power/voltage converter 16A (e.g., 20C) by connection of terminal F with terminal B and where the switching means 22 additionally connects the output of the power/voltage converter 20A to the input terminal of the HV battery 12A, or to one of the input terminals of the auxiliary power systems 12C, 12D, 12E (i.e., terminals C, D, E). It will be appreciated that the power/voltage converter 16A may operate to control the output voltage of the LV battery 12B to match a determined voltage input of the HV battery 12A or an input of one of the auxiliary power systems.

The other terminal of the voltage output (e.g., 20B) as well as the HV battery, LV battery and auxiliary power circuits associated with the hybrid vehicle electrical system are connected to ground potential 24. By selecting one of the inputs (A, C, D, E) to connect the output voltage (e.g., 20A) by switching means 22, one of multiple auxiliary power circuits e.g., 12C, 12D, 12E, or the HV battery 12A, the LV battery 12B may be used to provide power at a selected voltage through the power/voltage converter 16A. In addition, the LV battery 12B or the HV battery 12A may be powered by voltage from the power/voltage converter 16A where the voltage source for the power/voltage converter 16A is the solar panels 14 or other plug-in power source (not shown).

In a preferred embodiment, when the circuit switching means 22 is connected to one of multiple auxiliary power circuits e.g., 12C, 12D, 12E, (terminals C, D, E) or the HV battery 12A (terminal A), the power from the power/voltage converter 16A is provided at a selected operating voltage from the LV battery 12B (by connecting terminal B to terminal F). When the output of the power/voltage converter 20A is connected to the input to the LV battery (through terminal B; terminal F open), the power source for the power/voltage converter 16A is the solar collection means, e.g., solar panels 14, where the solar charge is transferred to and accumulated by the LV battery 12B.

The power/voltage converter 16A may be a conventional, bidirectional device that is capable of converting the power supplied by a power source (e.g., LV battery or solar charge collectors) into a voltage that is compatible with the requirements of the system loads, e.g. HV battery, cooling devices, resistive heating devices, and auxiliary power requirements. Specifically, the power/voltage converter 16A converts the voltage and current supplied by the power source (e.g., output of LV battery or solar charge collector) to levels that match the voltage to the system load requirements. In addition, power/voltage converter converts the charge collected by the solar collection means into an output voltage compatible for charging the LV battery when the output of the voltage/power converter is connected to the input of the LV battery.

For example, the HV battery 12A preferably is equipped with a conventional state-of-charge (SOC) sensor 22A which in turn is in communication with the charge controller 16B (e.g., wired connection 21A) to provide a SOC value of the HV battery to the charge controller 16B. The relative amount of power stored in a battery is often referred to as its "state-of-charge" (SOC), i.e. the amount of stored energy expressed as a percentage of the battery pack's total ampere-hour capacity. In order to efficiently charge and discharge, the battery (or other charge storage device) may be maintained within a charge range known as an SOC window that is adequate to meet the power requirements of the power system in which the battery is utilized.

If the charge controller determines that the HV battery 12A is at less than full charge (e.g., 55 to 60%) or less than a preprogrammed charge level (below an SOC window), the charge controller 16A may be pre-programmed to recharge the HV battery from power provided by the LV battery e.g., by selecting input terminal A according to circuit switching means 22 which connects voltage output 20A to HV battery input A and sets the output voltage to an appropriate charge voltage corresponding to the voltage of the HV battery, e.g., from about 200 to 400 volts DC.

When there is no demand for power from the HV battery (the SOC is at full charge or greater than a pre-programmed charge level) and no demand for power % from the auxiliary power circuits e.g., cooling circuit (e.g., fan) 12C, heating circuit 12D, or auxiliary charging circuit 12E, the circuit switching means 22 remains in a position where power/voltage converter output voltage 20A is connected through terminal B, to the LV battery 12B and where the power source is the solar collection means, e.g., solar panels 14, where the LV battery 12B collects solar charge to a useable voltage level, for example sufficient to recharge the HV battery 12A by connecting LV battery 12B to HV battery 12A through power/voltage converter 16A including using circuit switching means 22 to select terminal A (input for HV Battery). It will be appreciated that either or both the LV battery or HV battery may be recharged by separate plug-in voltage sources and that the charge controller 16B may control the power/voltage converter 16A output 20A to supply solar charge to the HV battery from the solar collection means 14 rather than from the LV battery 12B.

The LV battery 12B is also preferably equipped with a SOC sensor 22B which is in communication (e.g., wired connection 21B) with charge controller 168. The charge controller 16B may be preprogrammed to determine whether there is a sufficient charge in the LV battery to accomplish a charging function of the HV battery. If there is insufficient charge in the LV battery to charge the HV battery, the charge controller 16B may be pre-programmed to engage switching means 22 to allow the LV battery 12B to be recharged by solar collection means 14 or a plug-in charge source to a pre-programmed charge level to the exclusion of other power demands. Alternatively, the LV battery may power the auxiliary power circuits under special circumstances (e.g., the vehicle is being operated or manual override by vehicle operator/occupant).

It will be appreciated that the charge controller 16B in cooperation with the power/voltage converter 16A and LV battery 12B may provide power to the HV battery 12A through either pre-programmed instructions or in combination with a specialized electrical circuit e.g., boost circuit) to enable control of a voltage output (e.g., from LV battery through power/voltage converter) to the HV battery to accomplish the charging function quickly and safely. For example, the charge controller 16B together with the power/voltage converter 16A and LV battery 12B may begin to charge the HV battery at a selected output voltage level depending on the SOC of the HV battery and then follow a pre-programmed voltage output level depending on the subsequent SOC of the HV battery during charging. In addition, it will be appreciated that the boost circuit and/or charge controller may be operated by manual override by operator/occupant interaction, for example, when the SOC of the HV battery is too low to start the engine, manual override by activating the boost circuit and/or charge controller may be immediately effectuated by the operator/occupant (e.g., from within the vehicle) to provide an emergency boost (charge) from the LV battery to the HV battery (e.g., emergency charge and startup). It will be appreciated that normally, recharging the HV battery by the charge controller 16B together with the power/voltage converter 16A and LV battery 12B is automatically effected according to the pre-programmed charge controller when the HV battery falls below a predetermined charge level, including when the vehicle is not being operated.

The LV charge storage device such as LV battery 12B may be what is nominally referred to in the art as a 12 volt battery. It will be appreciated that the LV battery may have a range of output voltages depending on the SOC, e.g., including from 9 up to about 15 volts. For example, the charge controller 16B may be pre-programmed to provide a selected output voltage from the power/voltage converter where the charge source is the solar panels 14 and/or where the LV battery is connected (through the power/voltage converter) to the auxiliary power circuits at a predetermined voltage level. In addition, the charge controller 16B may be pre-programmed to control the power/voltage converter 16A to produce an output voltage from solar collection means at a selected voltage level for the most efficient charging of the LV battery, depending on the SOC of the LV battery as determined by SOC sensor 22B. For example, a voltage of 13.7 DC volts may be output from the power/voltage converter 16A to LV battery 12B where the power source is the solar panels to accumulate solar charge in the LV battery or from the LV battery to power the auxiliary power circuits.

It will be appreciated that the charge controller 16B may be pre-programmed to selectively provide charge from the solar collection means to the LV battery or HV battery to accumulate solar charge, or provide power (charge) from the LV battery to the HV battery or auxiliary power circuits according to a variety of priority based decision logic trees including overriding manual operation (e.g., from operator control panels) by a vehicle operator. For example, the decision logic tree may be constructed to give priority to charging the HV battery (assuming a sufficient charge exists in the LV battery) to the exclusion of all other power demands. Alternatively, or in addition, manual interaction by a vehicle operator from a control panel may override such pre-programmed instructions.

For example, in the case the LV battery charge level falls below a pre-programmed lower charge value, the charge controller may be programmed to exclude (ignore) power demands from the LV battery until the LV battery is recharged to a predetermined lower charge level by the solar collection means and/or plug-in charging sources. When the LV battery charge level is above the programmed lower charge level, there may be an intermediate range of charge level values where auxiliary power circuits or HV battery power demands may be met under special circumstances, e.g., the vehicle is being operated and/or a manual override interaction (e.g., emergency HV charge to start vehicle) is effected by a vehicle operator/occupant. When the LV battery charge level is above the intermediate range of charge level values, priority may be given to charging the HV battery, if required, as well as secondarily operating auxiliary power demands in the absence of a manual override interaction (e.g., emergency HV charge to start vehicle) by a vehicle operator/occupant.

For example, referring to FIG. 2 is shown an exemplary pre-programmed decision logic for operating the charge controller 16A to control output voltage from the power/voltage converter 16B.

If the HV battery is at less than full charge then:

1) connect output voltage to HV battery input;
2) set output voltage to HV charge voltage;
Else (otherwise)
   (1) set output voltage to LV output (e.g.,
      13.7 Volts);

```
If LV battery is less than a predetermined
charge (full charge) then:
    connect output voltage to LV battery
        input;
Else
    if interior temperature is less than a
    sensed interior vehicle temperature then:
        connect output voltage to resistive
            heater;
        Else
        connect output voltage to cooling
            system;
        end if;
    end if;
end if;
```

Thus, in the exemplary decision logic tree shown in FIG. 2, charging the HV battery has the highest priority, recharging the LV battery has the next highest priority, and operation of auxiliary power systems (e.g., heating or cooling the vehicle) has the next highest priority based on a sensed vehicle condition. It will be appreciated that other decision trees may be provided as discussed above.

Thus, a hybrid vehicle charging/auxiliary power system and method has been presented that provides solar charging of an auxiliary charge storage device such as an LV battery which can then be used to ensure that a second charge storage device such as an HV traction battery is fully charged prior to or at the start of operation of a hybrid vehicle, thus ensuring enough power is always available to start the hybrid vehicle. An additional advantage provided by the present invention, is that the auxiliary LV battery may be used to power auxiliary systems without the consequential concern that the LV battery will be discharged to the detriment of starting and driving the hybrid vehicle.

While the embodiments illustrated in the Figures and described above are presently preferred, it should be understood that these embodiments are offered by way of example only. The invention is not limited to a particular embodiment, but extends to various modifications, combinations, and permutations as will occur to the ordinarily skilled artisan that nevertheless fall within the scope of the appended claims.

What is claimed is:

1. A solar powered hybrid power system comprising:
a solar charge collector adapted to collect solar charge;
a charge storage system comprising at least a first charge storage device adapted to receive and store charge from said solar charge collector;
wherein said charge storage system further comprises a power electronic circuit selectively connectable to at least a second charge storage device, said power electronic circuit adapted to transfer said stored charge from said first charge storage device to said at least a second charge storage device at a selectable voltage level, said second charge storage device at a higher voltage level than said first charge storage device, said first charge storage device simultaneously powering at least one power system, said solar charge collector alternately connectable through said power electronic circuit to said second charge storage system to charge said second charge storage system, said solar charge collector connected in series to said second charge storage system during said charging.

2. The solar powered hybrid power system of claim 1, wherein said power electronic circuit is further alternately connectable in series to said at least one power system at a selectable voltage level to power said at least one power system.

3. The solar powered hybrid power system of claim 2, wherein said at least one power system is selected from the group consisting of a cooling system, a ventilation system, a heating system, a defrosting system, and an auxiliary power supply system.

4. The solar powered hybrid power system of claim 1, wherein said power electronic circuit comprises a voltage converter.

5. The solar powered hybrid power system of claim 1, wherein said solar charge collector is selectively connectable to said at least a first charge storage device through said power electronic circuit.

6. The solar powered hybrid power system of claim 5, wherein said at least a first charge storage device is adapted to receive charge from said solar charge collector at a first predetermined voltage level to accumulate a predetermined charge level in said first charge storage device.

7. The solar powered hybrid power system of claim 1, wherein said at least a first charge storage device is adapted to transfer said stored charge upon a determination that the at least a first charge storage device has accumulated a first predetermined charge level.

8. The solar powered hybrid power system of claim 7, wherein said at least a second charge storage device is adapted to receive said stored charge until a determination is made that said at least a second charge storage device has been charged to a second predetermined charge level.

9. The solar powered hybrid power system of claim 1, further comprising a programmable controller in communication with said power electronic circuit said programmable controller adapted to control said power electronic circuit to output voltage a selected voltage level.

10. The solar powered hybrid power system of claim 1, wherein said power electronic circuit comprises a circuit switching means adapted to selectively connect said output of said at least a first charge storage device with an input of one of said at least a second charge device and at least one power system.

11. The solar powered hybrid power system of claim 1, wherein said power electronic circuit further comprises an operator controlled means adapted to selectively connect an output of said at least a first charge storage device to an input of said at least a second charge storage device to transfer said stored charge.

12. The solar powered hybrid power system of claim 1, wherein said at least a first charge storage device and said at least a second charge storage device comprise respective state-of-charge (SOC) sensors adapted for sensing a charge state of said respective at least a first and at least a second charge storage device.

13. The solar powered hybrid power system of claim 12, wherein said respective state-of-charge (SOC) sensors are in communication with a programmable controller.

14. The solar powered hybrid power system of claim 1, wherein said at least a first charge storage device and said at least a second charge storage device are selected from the group consisting of a battery and a capacitor.

15. The solar powered hybrid power system of claim 1, wherein at least one of said at least a first charge storage device and said at least a second charge storage device comprises a DC battery.

16. The solar powered hybrid power system of claim 1, wherein the first charge storage device operates at a lower DC voltage than said second charge storage device.

17. The solar powered hybrid power system of claim 1, wherein the second charge storage device has an operating voltage in a range of from about 200 volts to about 400 volts DC.

18. A solar powered hybrid power system comprising:
a solar charge collector adapted to collect solar charge;
a charge storage system comprising at least a first charge storage device adapted to receive and store charge from said solar charge collector;
wherein said charge storage system further comprises a power electronic circuit selectively connectable to at least a second charge storage device, said power electronic circuit adapted to transfer said stored charge to said at least a second charge storage device at a selectable voltage level, said second charge storage device at a higher voltage level than said first charge storage device, said first charge storage device simultaneously powering at least one power system, said solar charge collector alternately connectable to said second charge storage system to charge said second charge storage system, said solar charge collector connected in series to said second charge storage system during said charging; and,
wherein said power electronic circuit is further alternately connectable in series to said at least one power system at a selectable voltage level to power said at least one power system.

* * * * *